(12) United States Patent
Itatsu

(10) Patent No.: US 11,958,423 B2
(45) Date of Patent: Apr. 16, 2024

(54) ON-BOARD COMMUNICATION DEVICE, PROGRAM, AND COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Taro Itatsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 349 days.

(21) Appl. No.: 17/430,784

(22) PCT Filed: Feb. 13, 2020

(86) PCT No.: PCT/JP2020/005524
§ 371 (c)(1),
(2) Date: Aug. 13, 2021

(87) PCT Pub. No.: WO2020/170926
PCT Pub. Date: Aug. 27, 2020

(65) Prior Publication Data
US 2022/0126770 A1    Apr. 28, 2022

(30) Foreign Application Priority Data
Feb. 18, 2019 (JP) .................... 2019-026828

(51) Int. Cl.
*B60R 16/023* (2006.01)
*G06F 21/44* (2013.01)

(52) U.S. Cl.
CPC ...... *B60R 16/0234* (2013.01); *B60R 16/0238* (2013.01); *G06F 21/44* (2013.01)

(58) Field of Classification Search
CPC ... B60R 16/00; B60R 16/023; B60R 16/0234; B60R 16/0238; B60R 16/0231;
(Continued)

(56) References Cited

U.S. PATENT DOCUMENTS 10,246,109 B2 * 4/2019 James .................... B61G 11/00
2004/0003237 A1 1/2004 Puhl et al.
(Continued)

FOREIGN PATENT DOCUMENTS

JP    2013-234521 A    11/2013
JP    2016-094158 A    5/2016

OTHER PUBLICATIONS

NPL Search (Sep. 27, 2023).*
International Search Report, Application No. PCT/JP2020/005524, dated Apr. 28, 2020.

*Primary Examiner* — Van T Trieu
(74) *Attorney, Agent, or Firm* — Honigman LLP

(57) ABSTRACT

An on-board communication device is configured to be communicably connected to on-board ECUs provided in a vehicle, and to acquire configuration information transmitted from the on-board ECUs, the on-board communication device including a control unit that controls communication with an external authentication device that is connected from outside of the vehicle when replacement or addition of an on-board ECU is performed, and if previously-acquired configuration information is different from presently-acquired configuration information, the control unit attempts communication with the external authentication device, and if communication with the external authentication device is not performed in a normal manner, the control unit deter- (Continued)

mines that the on-board ECU has undergone improper replacement or addition.

15 Claims, 10 Drawing Sheets

(58) Field of Classification Search
CPC ........ G06F 21/00; G06F 21/55; G06F 21/554;
G06F 21/74; G07C 5/00; G07C 5/008;
G07C 5/08; H04L 12/28; H04L 29/00;
H04L 29/06; H04L 63/08; H04L 63/1466;
H04L 67/12; G05D 1/00
See application file for complete search history.

(56) References Cited

U.S. PATENT DOCUMENTS

| | | |
|---|---|---|
| 2011/0083161 A1 | 4/2011 | Ishida et al. |
| 2013/0227650 A1 | 8/2013 | Miyake |
| 2018/0144388 A1* | 5/2018 | Mattern ............. G06Q 30/0631 |
| 2019/0337526 A1* | 11/2019 | Rave ..................... G06F 21/554 |
| 2021/0012588 A1* | 1/2021 | Kwon .................... G07C 5/008 |

* cited by examiner

FIG. 3

Vehicle configuration information master table

| ECU-ID | Manufacturing number (serial number) | A | Software part number | Current version | Old version | Number of operating regions | Operating region |
|---|---|---|---|---|---|---|---|
| 001 | SN-ABC-0120 | AAAA | swaaa | 3.51 | 3.44 | 1 | 1st region |
| 002 | SN-XCC-9999 | BBBB | swbbb | 4.2d | 4.2c | 2 | 2nd region |
| 003 | ... | ... | | | | | |
| 004 | ..... | ..... | | | | | |

| MAC address | IP address | Previous update completion date and time | B | VIN (Vehicle identification number) |
|---|---|---|---|---|
| f2-23-xx-15-fc-xx | 192.168.10.5 | 2018/3/20/18:15 | Complete | 123456789A1234567 |
| ab-xx-55-23-ac-xx | 192.168.10.6 | 2018/1/23/07:45 | Complete | null |
| | | | | |
| | | | | |

Legend
A= ECU part number (model number)
B= Reprogramming status

Legend
A= Acquire configuration information

ON-BOARD COMMUNICATION DEVICE, PROGRAM, AND COMMUNICATION METHOD

CROSS-REFERENCE TO RELATED APPLICATIONS

This application is the U.S. national stage of PCT/JP2020/005524 filed on Feb. 13, 2020, which claims priority of Japanese Patent Application No. JP 2019-026828 filed on Feb. 18, 2019, the contents of which are incorporated herein.

TECHNICAL FIELD

The present disclosure relates to an on-board communication device, a program, and a communication method.

BACKGROUND

Vehicles are provided with on-board ECUs (Electronic Control Units) for controlling on-board devices such as a power train system for controlling an engine and the like, and a body system for controlling an air conditioner and the like. The on-board ECUs include computation processing units such as MPUs, rewriteable nonvolatile storage units such as RAMs, and communication units for communicating with other on-board ECUs, and control on-board devices by reading and executing control programs stored in the storage units. Furthermore, on-board communication devices (relay devices) that have wireless communication functionality are mounted in the vehicles, and the relay devices acquire information regarding these on-board ECUs (vehicle specification information) from devices outside of the vehicles, and store the information (see JP 2016-94158A, for example).

In a relay device according to JP 2016-94158A, when an on-board ECU is replaced, a determination of whether or not such replacement is proper is not taken into consideration, and thus there is concern that, when an on-board ECU is improperly replaced, it is difficult to detect such improper replacement.

An object of the present disclosure is to provide an on-board communication device and the like that can determine, when an on-board ECU is replaced, whether or not such replacement is proper.

SUMMARY

An on-board communication device according to one aspect of the present disclosure is configured to be communicably connected to on-board ECUs provided in a vehicle, and to acquire configuration information transmitted from the on-board ECUs, the on-board communication device including a control unit, and the control unit controls communication with an external authentication device that is connected from outside of the vehicle when replacement or addition of an on-board ECU is performed, and if previously-acquired configuration information is different from presently-acquired configuration information, the control unit attempts communication with the external authentication device, and, if communication with the external authentication device is not performed in a normal manner, the control unit determines that the on-board ECU was improperly replaced or added.

Advantageous Effects of Present Disclosure

According to one aspect of the present disclosure, it is possible to provide an on-board communication device and the like that can determine, when an on-board ECU is replaced, whether or not such replacement is proper.

BRIEF DESCRIPTION OF DRAWINGS

FIG. 2 is a block diagram illustrating configurations of the on-board communication device and the like.

FIG. 3 is an illustration diagram illustrating an aspect of configuration information of on-board ECUs.

DETAILED DESCRIPTION OF PREFERRED EMBODIMENTS

Figure 1:
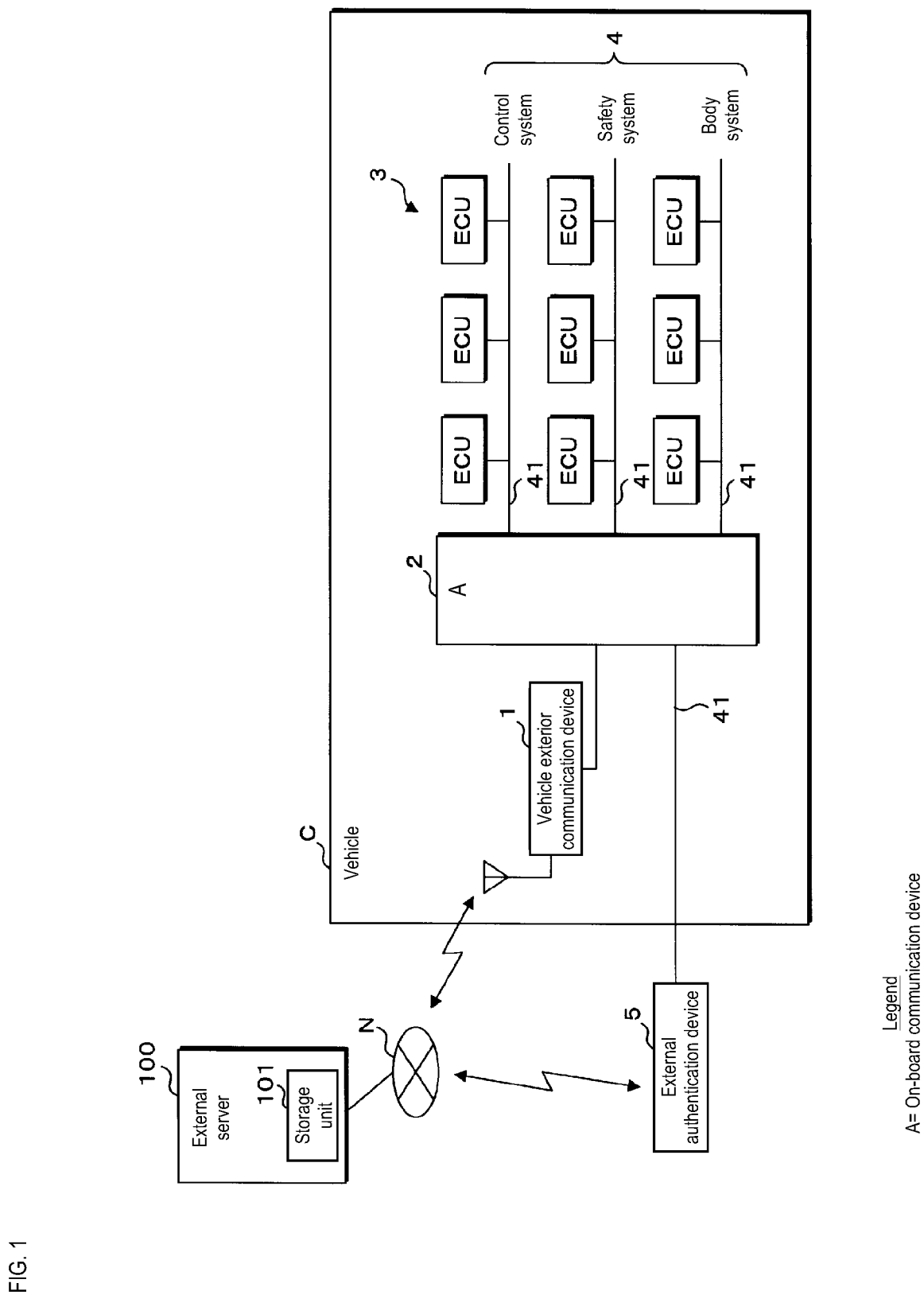
FIG. 1 is a schematic diagram illustrating a configuration of an on-board communication system that includes an on-board communication device according to a first embodiment.

First, embodiments of the present disclosure will be listed and described. At least one or more of the embodiments described below may be combined together in any manner.

An on-board communication device according to one aspect of the present disclosure is configured to be communicably connected to on-board ECUs provided in a vehicle, and to acquire configuration information transmitted from the on-board ECUs, the on-board communication device including a control unit, and the control unit controls communication with an external authentication device that is connected from outside of the vehicle when replacement or addition of an on-board ECU is performed, and if previously-acquired configuration information is different from presently-acquired configuration information, the control unit attempts communication with the external authentication device, and, if communication with the external authentication device is not performed in a normal manner, the control unit determines that the on-board ECU has undergone improper replacement or addition.

According to this aspect, the previously-acquired configuration information being different from the presently-acquired configuration information indicates that the on-board ECU underwent replacement or addition during a period from when the previous configuration information was acquired until when the present configuration information is acquired. When proper work of replacement or the like of an on-board ECU is performed, an external authentication device is connected to the vehicle, but if communication between the control unit and the external authentication device is not performed in a normal manner, it is envisioned that the external authentication device is not connected to the vehicle. Therefore, by determining that an on-board ECU has undergone improper replacement if previously-acquired configuration information is different from presently-acquired configuration information and communication between the control unit and the external authentication device is not performed in a normal manner, it is possible to appropriately determine whether or not such replacement is proper.

In the on-board communication device according to one aspect of the present disclosure, when the vehicle is started, the control unit acquires configuration information from the on-board ECUs.

According to this aspect, the control unit acquires the configuration information when the vehicle is started, and thus it is possible to appropriately determine whether or not replacement or the like of an on-board ECU performed while the vehicle was stopped is proper.

In the on-board communication device according to one aspect of the present disclosure, if it is determined that an on-board ECU has undergone improper replacement or addition, the control unit specifies the on-board ECU that has undergone improper replacement or addition, based on a difference between the previously-acquired configuration information and the presently-acquired configuration information.

According to this aspect, if it is determined that an on-board ECU has undergone improper replacement, the control unit transmits information regarding the determination to an external server outside of the vehicle or a display device provided in the vehicle, and thus it is possible to perform notification of the information regarding the determination to the administrator of the external server or the operator of the vehicle.

In the on-board communication device according to one aspect of the present disclosure, if it is determined that the on-board ECU has undergone improper replacement or addition, the control unit transmits information regarding the determination to a display device provided in the vehicle.

According to this aspect, the control unit specifies the on-board ECU that has undergone improper replacement or addition, based on the difference between the previously-acquired configuration information and the presently-acquired configuration information, and thus it is possible to efficiently specify the on-board ECU that has undergone improper replacement or the like.

In the on-board communication device according to one aspect of the present disclosure, the control unit outputs the presently-acquired configuration information to the external authentication device, and the configuration information output to the external authentication device is transmitted to an external server outside of the vehicle by the external authentication device.

According to this aspect, the configuration information acquired by the control unit is transmitted to the external server outside of the vehicle by the external authentication device, and thus the configuration information can be efficiently transmitted to the external server using a secure communication environment in which connection is made via the external authentication device.

In the on-board communication device according to one aspect of the present disclosure, when communication with the external authentication device is performed in a normal manner, the control unit acquires the configuration information transmitted from the external authentication device to the external server, from the external server via a vehicle exterior communication device communicably connected to the control unit, and if the configuration information acquired from the external server is different from the presently-acquired configuration information, the control unit determines that the external authentication device is unauthorized.

According to this aspect, the control unit acquires configuration information transmitted to the external server via the external authentication device, from the external server via the vehicle exterior communication device, and if the configuration information acquired from the external server is different from the presently-acquired configuration information, the control unit determines that the external authentication device is unauthorized. Therefore, even if the external authentication device connected to the vehicle is an unauthorized external authentication device spoofing as an authorized external authentication device and the unauthorized external authentication device makes it appear as if communication with the control unit is performed in a normal manner, it is possible to determine that the external authentication device is unauthorized. In addition, a configuration may also be adopted in which, if it is determined that the external authentication device is unauthorized, it is determined that replacement or the like of an on-board ECU performed while the unauthorized external authentication device is connected is also improper.

In the on-board communication device according to one aspect of the present disclosure, when a notification that transmission of configuration information from the external authentication device to the external server is complete is acquired from the external authentication device, the control unit acquires the configuration information transmitted from the external authentication device to the external server, from the external server via the vehicle exterior communication device communicably connected to the control unit.

According to this aspect, when the external authentication device transmits configuration information to the external server, and the transmission is completed in a normal manner, the external authentication device transmits (outputs), to the on-board communication device, a notification that transmission of configuration information to the external server is complete (transmission completion notification). Upon receiving the notification that transmission of configuration information from the external authentication device to the external server is complete (transmission completion notification), the control unit of the on-board communication device acquires, from the external server, the configuration information (configuration information transmitted by the external authentication device). Thus, the control unit acquires the configuration information from the external server based on the transmission completion notification from the external authentication device, and thus it is possible to prevent old configuration information from being acquired from the external server before configuration information stored in the external server is updated, or in other words, before transmission of configuration information from the external authentication device is complete.

A program according to one aspect of the present disclosure causes a computer to execute processing for: acquiring configuration information transmitted from on-board ECUs provided in a vehicle; if previously-acquired configuration information is different from presently-acquired configuration information, attempting communication with an external authentication device that is connected from outside of the vehicle when replacement or addition of an on-board ECU is performed; and, if communication with the external authentication device is not performed in a normal manner, determining that the on-board ECU has undergone improper replacement or addition.

According to this aspect, it is possible to cause a computer to function as an on-board communication device that can determine, when an on-board ECU undergoes replacement, whether or not such replacement is proper replacement.

A communication method according to one aspect of the present disclosure includes: acquiring configuration information transmitted from on-board ECUs provided in a vehicle; if previously-acquired configuration information is different from presently-acquired configuration information, attempting communication with an external authentication device that is connected from outside of the vehicle when replacement or addition of an on-board ECU is performed; and, if communication with the external authentication device is not performed in a normal manner, determining that the on-board ECU has undergone improper replacement or addition.

According to this aspect, it is possible to provide a communication method according to which it is possible to determine, when an on-board ECU is replaced, whether or not such replacement is proper replacement.

The following specifically describes the present disclosure based on drawings that illustrate embodiments thereof. An on-board communication device 2 according to embodiments of the present disclosure will be described below with reference to the drawings. Note that the present disclosure is not limited to the examples, but is indicated by the claims, and is intended to include all modifications within the meaning and scope equivalent to the scope of the claims.

First Embodiment

Figure 2:
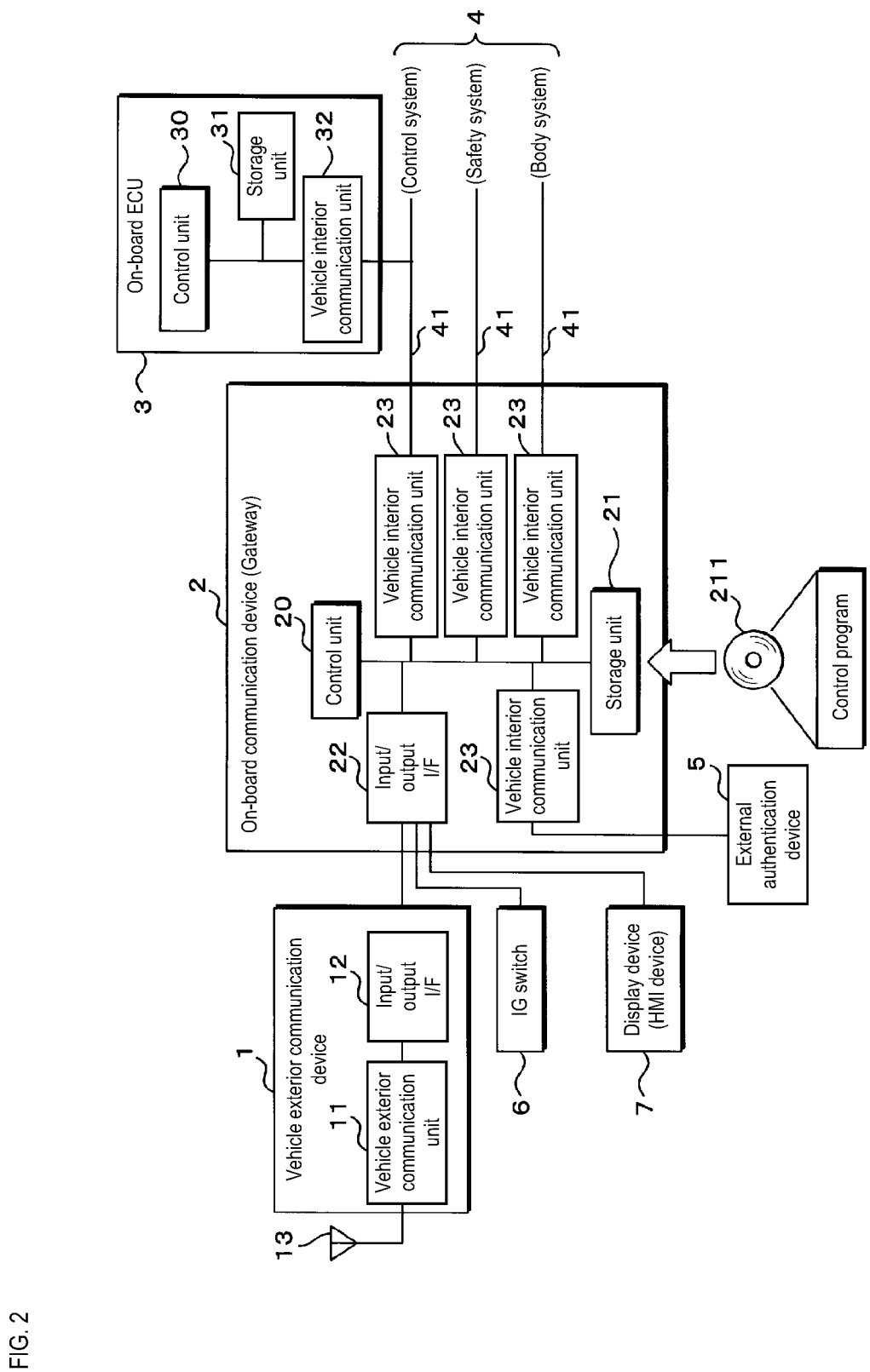

The following describes an embodiment based on the drawings. FIG. 1 is a schematic diagram illustrating the configuration of an on-board communication system that includes an on-board communication device according to a first embodiment. FIG. 2 is a block diagram illustrating configurations of the on-board communication device and the like. The on-board communication system includes a vehicle exterior communication device 1 and an on-board communication device 2, which are provided in a vehicle C, and transmits a program or data acquired from an external server 100 connected via an external network N, to on-board ECUs 3 (Electronic Control Units) provided in the vehicle C. In addition, when an external authentication device 5 is connected to the vehicle C, the external authentication device 5 communicates with the external server 100 via the external network N.

The external server 100 is a computer such as a server connected to the external network N such as the Internet or a public network, and includes a storage unit 101 formed using a RAM (Random Access Memory), a ROM (Read Only Memory), a hard disk, or the like. In the external server 100, the storage unit 101 stores a program or data for controlling an on-board ECU 3, the program or data having been created by the manufacturer or the like of the on-board ECU 3. The program or data is transmitted as an update program to the vehicle C as will be described later, and is used for updating the program or data of the on-board ECU 3 provided in the vehicle C. The external server 100 configured in this manner is also called an OTA (Over The Air) server. Each on-board ECU 3 provided in the vehicle can update the program to be executed by itself (reprogram) by acquiring an update program transmitted from the external server 100 through wireless communication, and adopting the update program as a program to be executed. The storage unit 101 of the external server 100 stores configuration information of each on-board ECU 3 transmitted from the external authentication device 5. The configuration information includes identification information (VIN: vehicle identification number) for identifying the vehicle C. The external server 100 specifies the vehicle C based on the identification information, and communicates with the specified vehicle C in relation to the configuration information of each on-board ECU 3 of the vehicle C.

The vehicle exterior communication device 1, the on-board communication device 2, a display device 7, and a plurality of on-board ECUs 3 for controlling various on-board devices are provided in the vehicle C. The vehicle exterior communication device 1 and the on-board communication device 2 are connected via a harness such as a serial cable harness so as to be able to communicate with each other. The on-board communication device 2 and the on-board ECUs 3 are connected via communication lines 41 and a vehicle interior LAN 4 that conform to a communication protocol such as a CAN (Control Area Network (registered trademark)) or Ethernet (registered trademark) so as to be able to communicate with each other.

The vehicle exterior communication device 1 includes a vehicle exterior communication unit 11 and an input/output I/F (interface) 12 for communicating with the on-board communication device 2. The vehicle exterior communication unit 11 is a communication device for performing wireless communication using a mobile communication protocol such as 3G, LTE, 4G, or WiFi, and transmits data to, and receives data from the external server 100 via an antenna 13 connected to the vehicle exterior communication unit 11. Communication between the vehicle exterior communication device 1 and the external server 100 is performed via the external network N such as a public network or the Internet.

The input/output I/F 12 is a communication interface for performing, for example, serial communication with the on-board communication device 2. The vehicle exterior communication device 1 and the on-board communication device 2 communicate with each other via the input/output I/F 12 and a harness such as a serial cable harness connected to the input/output I/F 12. In the present embodiment, the vehicle exterior communication device 1 and the on-board communication device 2 are separate devices and are connected via the input/output I/F 12 so as to be able to communicate with each other, but the present disclosure is not limited to such a configuration. The vehicle exterior communication device 1 may be built into the on-board communication device 2 as one constitutional part of the on-board communication device 2.

The on-board communication device 2 includes a control unit 20, a storage unit 21, an input/output I/F 22, and vehicle interior communication units 23. The on-board communication device 2 is a gateway (a relay device) that generally controls segments of systems formed by a plurality of communication lines 41, such as an on-board ECU 3 of a control system, an on-board ECU 3 of a safety system, and an on-board ECU 3 of a body system, for example, and relays communication between the on-board ECUs 3 of these segments. Alternatively, the on-board communication device 2 may be configured as one functional unit of the body ECU that controls the entirety of the vehicle C. The on-board communication device 2 may be configured to acquire, from the vehicle exterior communication device 1, an update program received from the external server 100 through wireless communication by the vehicle exterior communication device 1, and transmit the update program to a predetermined on-board ECU 3 (an on-board ECU 3 to be updated) via the vehicle interior LAN 4.

The control unit 20 is constituted by a CPU (Central Processing Unit), an MPU (Micro Processing Unit), or the like, and is configured to perform various types of control processing, computation processing, and the like by reading out and executing a control program and data stored in the storage unit 21 in advance. The control unit 20 executes the control program, and thereby functions as an acquisition unit that acquires configuration information or an update program of an on-board ECU 3 transmitted from the external server 100, via the vehicle exterior communication device 1. The control unit 20 executes the control program, and thereby functions as a determination unit that communicates with the external authentication device 5 to be described later or the external server 100, and determines whether or not replacement or the like of an on-board ECU 3 has been performed properly.

The storage unit 21 is formed using a volatile memory device such as a RAM (Random Access Memory) or a nonvolatile memory device such as a ROM (Read Only Memory), an EEPROM (Electrically Erasable Programmable ROM), or a flash memory, and a control program and data to be referred to at the time of processing are stored therein in advance. The control program stored in the storage unit 21 may be a control program read out from a recording medium 211 that can be read by the on-board communication device 2 and stored in the storage unit 21. Also, the control program may be a control program downloaded from an external computer (not shown) connected to a communication network (not shown), and stored in the storage unit 21. Furthermore, configuration information of every on-board ECU 3 provided in the vehicle C is stored in the storage unit 21. The storage unit 21 may store an update program acquired from the external server 100 and information regarding the progress of transmission of an update program to an on-board ECU 3.

Similarly to the input/output I/F 12 of the vehicle exterior communication device 1, the input/output I/F 22 is a communication interface for performing serial communication, for example. The on-board communication device 2 is connected to the vehicle exterior communication device 1 and an IG switch 6 via the input/output I/F 22 so as to be able to communicate with each other.

The vehicle interior communication units 23 are input/output interfaces that employ a communication protocol such as a CAN (Control Area Network) or Ethernet (registered trademark), and the control unit 20 communicates with an on-board ECU 3 connected to the vehicle interior LAN 4 or another on-board device such as a relay device with each other via a vehicle interior communication unit 23. A plurality of vehicle interior communication units 23 are provided, and communication lines 41 that constitute the vehicle interior LAN 4 are respectively connected to the vehicle interior communication units 23. The vehicle interior LAN 4 is divided into a plurality of segments by providing a plurality of vehicle interior communication units 23 in this manner, and an on-board ECU is connected to each of the segments according to the function (the control system function, the safety system function, or the body system function) of the on-board ECU. The external authentication device 5, which will be described later, is connected to a vehicle interior communication unit 23 as necessary, and when the external authentication device 5 is connected, the control unit 20 mutually communicates with the external authentication device 5 via the vehicle interior communication unit 23.

Each on-board ECU 3 includes a control unit 30, a storage unit 31, and a vehicle interior communication unit 32. The storage unit 31 is formed using a volatile memory device such as a RAM (Random Access Memory) or a nonvolatile memory device such as a ROM (Read Only Memory), an EEPROM (Electrically Erasable Programmable ROM), or a flash memory, and a program or data for the on-board ECU 3 is stored therein. This program or data is to be updated with an update program transmitted from the on-board communication device 2. Also, the storage unit 31 stores configuration information of the ECU.

The storage unit 31 includes a first storage area (a first region) and a second storage area (a second region). The storage unit 31 stores two programs, namely a program (a current version) that is currently being executed (adopted) by the on-board ECU 3 and a program (an old version) that has been adopted before the current version. The current version of the program and the old version of the program are separately stored in the first storage area and the second storage area. That is to say, if the current version of the program is stored in the first storage area, the old version of the program is stored in the second storage area. If the old version of the program is stored in the first storage area, the current version of the program is stored in the second storage area. By storing two programs, i.e. the current version and the old version in this manner in the form of a so-called "two region storage", even if a problem occurs in the current version of the program, the control unit 30 reads and executes (switches to) the old version of the program that has been adopted previously and has been running normally. Thus, it is possible to enhance the reliability of the on-board ECU 3. The storage unit 31 is not limited to a two region storage, and may store programs in the form of one region storage that has a first storage region only.

The storage unit 31 stores information regarding the versions of the two programs, namely the current version and the old version, and information regarding the area (the operating region) in which the currently executed (adopted) program is stored. That is to say, if the program stored in the first storage area (the first region) is currently being executed, the storage unit 31 stores information indicating that the operating region is the first storage area (the first region). If the program stored in the second storage area (the second region) is currently being executed, the storage unit 31 stores information indicating that the operating region is the second storage area (the second region). The storage unit 31 stores information regarding the configuration of the ECU including information regarding the versions of the program (the current version and the old version) and information regarding the operating region, information regarding the progress of reception of an update program from the on-board communication device 2, and information regarding the update history of one or more updates performed in the past.

The control unit 30 is formed using a CPU (Central Processing Unit), an MPU (Micro Processing Unit), or the like, and performs control processing and the like by reading out and executing a program and data stored in the storage unit 31 (the operating region) so that the on-board device that includes the on-board ECU 3, an actuator, and the like are controlled.

The external authentication device 5 is a device (diagnostic tool) that is used by an overhaul provider of the vehicle C that may be a regular dealer or the like responsible for overhaul work of the vehicle C such as replacement or the like of an on-board ECU 3, a device obtained by installing a dedicated application in a general-purpose information terminal such as a personal computer, a tablet PC, or a smart phone, or a device that includes hardware and is configured as a dedicated information terminal. The external authentication device 5 includes a control unit (not illustrated) formed using a CPU or an MPU similarly to the above-described on-board ECU 3, a storage unit (not illustrated), and a vehicle interior communication unit (not illustrated). The vehicle interior communication unit of the external authentication device 5 is not limited to a CAN or Ethernet, which is similar to that of on-board ECU 3, and may be, for example, an input/output I/F or a communication module for performing communication through a wire harness such as a serial cable harness. The external authentication device 5 communicates with the on-board communication device 2 or each on-board ECUs 3 via a vehicle interior LAN or the like using the vehicle interior communication unit. Alternatively, a configuration may be adopted in which the vehicle interior communication unit of the external authentication device 5 has wireless communication functionality, and the external authentication device 5 communicates with the on-board communication device 2 through wireless communication. Furthermore, the external authentication device 5 includes a vehicle exterior communication unit (not illustrated) for communicating with the external server 100. The vehicle exterior communication unit of the external authentication device 5 is a communication module that has wired or wireless communication functionality, and the external authentication device 5 communicates with the external server 100 via the external network N using the vehicle exterior communication unit. The external authentication device 5 is disposed in a work environment of a regular dealer or the like that has been described above, and can reliably communicate with the external server 100 using the communication environment of the regular dealer or the like and the external server 100.

The storage unit of the external authentication device 5 stores a program related to a communication procedure for communicating with the external server 100 in a regular manner and authentication information that includes a public key or a common key. When overhaul work of the vehicle C such as replacement, addition, or the like of an on-board ECU 3 is performed, the external authentication device 5 is communicably connected to the on-board communication device 2, as a result of being directly connected to the on-board communication device 2 as shown in FIG. 2 or being connected to any location of the on-board LAN 4. When an on-board ECU 3 is replaced or added, the external authentication device 5 acquires configuration information of each on-board ECU 3 that is provided in the vehicle C after replacement or the like is performed, and transmits the acquired configuration information to the external server 100 based on a predetermined regular communication procedure, for example, along with the authentication information in which a public key or a common key is used. By using the authentication information, the external authentication device 5 can communication with (transmit/receive data to/from) the external server 100 in a secure communication environment. The authentication information may also be a client certificate that complies with SSL (Secure Sockets Layer)/TSL (Transport Layer Security), for example.

Usually, replacement or the like of an on-board ECU 3 is performed while the vehicle C is stopped. While the vehicle C is stopped, power supply to the on-board ECUs 3 is also stopped, and thus the external authentication device 5 cannot communicate with the on-board ECUs 3, and cannot acquire configuration information from the on-board ECUs 3. In a state where the external authentication device 5 is connected to the on-board communication device 2 after replacement or the like of an on-board ECU 3 has ended, the IG switch of the vehicle C is turned on, and the vehicle C starts. In accordance with the start of the vehicle C, power is supplied from a power storage device such as an on-board battery (not illustrated) to the on-board ECUs 3, and the on-board ECUs 3 start. In this state, the external authentication device 5 communicates with the on-board ECUs 3, and acquires configuration information of the on-board ECUs 3. Alternatively, a configuration may also be adopted in which, when the IG switch is turned on, the on-board communication device 2 acquires configuration information from the on-board ECU, and, after the on-board communication device 2 has acquired the configuration information, the external authentication device 5 acquires (receives) the configuration information from the on-board communication device 2. The external authentication device 5 transmits the acquired configuration information to the external server 100, using regular communication means that uses the authentication information.

In communication between the external authentication device 5 and the external server 100, it is possible to reduce the influence of the radio wave condition of broad-band wireless communication such as 4G and to improve the communication quality by using the communication environment of a regular dealer or the like and the external server 100. In addition, communication between the external authentication device 5 and the external server 100 is performed by regular communication means that uses the above-described authentication information, and thus it is possible to ensure secure communication.

The IG switch (ignition switch) 6 for starting or stopping the vehicle C is communicably connected to the input/output I/F 22 of the on-board communication device 2 using a wire harness such as a serial cable harness. When the IG switch 6 is turned on or off, the control unit 20 of the on-board communication device 2 acquires (receives) a signal output (transmitted) from the IG switch 6, via the input/output I/F 22. The control unit 20 of the on-board communication device 2 transmits information regarding switching on or off of the IG switch 6 (IG on signal or IG off signal) to every on-board ECU 3 via the vehicle interior communication units 23 based on the acquired signal, and if the external authentication device 5 is connected to the vehicle C, the control unit 20 also transmits the information to the external authentication device 5. The on-board ECUs 3 and the external authentication device 5 acquire the information regarding switching on or off of the IG switch 6 (IG on signal or IG off signal) transmitted from the on-board communication device 2), and performs a predetermined operation based on the acquired information.

The display device 7 is an HMI (Human Machine Interface) device such as a display of a car navigation system, for example. The display device 7 is connected to the input/output I/F 22 of the on-board communication device 2 via a harness such as a serial cable harness so as to be able to communicate with each other. The display device 7 displays data or information output from the control unit 20 of the on-board communication device 2 via the input/output I/F 22.

FIG. 3 is an illustration diagram illustrating an aspect of configuration information of on-board ECUs. Upon the IG switch 6 being turned on or off, or at a predetermined time, the control unit 20 of the on-board communication device 2 requests that every on-board ECU 3 invariably mounted in the vehicle C or a specific on-board ECU 3 transmit configuration information of the ECU and the update history of the configuration information to the control unit 20. The on-board communication device 2 then acquires the configuration information and update history transmitted from every on-board ECU 3, collects such configuration information and the like, and stores, in the storage unit 21, the collected configuration information (vehicle configuration information) and update history (vehicle configuration information update history). Alternatively, a configuration may be adopted in which the control unit 20 of the on-board communication device 2 acquires and collects configuration information and update history autonomously transmitted by each on-board ECU 3, and store them in the storage unit 21, without requesting the on-board ECU 3 to transmit configuration information and update history. Alternatively, a configuration may be adopted in which the control unit 20 of the on-board communication device 2 transmits an update program to an on-board ECU 3, and every time such transmission is complete, the control unit 20 changes the configuration information (vehicle configuration information) based on the transmitted update program.

The storage unit 21 of each on-board ECU 3 stores the configuration information and update history thereof. Therefore, the on-board communication device 2 collects the configuration information and the update history stored in each on-board ECU 3, and stores the configuration information and the update history of the on-board ECU 3. The on-board communication device 2 may transmit the collected and stored configuration information and update history of each on-board ECU 3 to the external server 100. By transmitting the configuration information and update history to the external server 100, it is possible to back up the configuration information and the update history in the storage unit 101 of the external server 100. The on-board communication device 2 may transmit such configuration information to the external authentication device 5, for example, upon receiving an IG on signal, or in accordance with a request from the external authentication device 5.

As shown in FIG. 3, configuration information regarding the on-board ECUs 3 (a vehicle configuration information master table) includes, for example, the manufacturing number (serial number), the ECU part number (the model number), the software part number, the current version of the program, the old version of the program, the number of operating regions, the operating region, the MAC (Media Access Control) address, the IP address, the previous update completion date and time, the reprogramming status, and VIN (vehicle identification number) of each on-board ECU 3, and such pieces of information are managed in association with the respective ECU-IDs of the on-board ECU 3, which are sequential numbers set so as not to be duplicate.

The "manufacturing number (serial number)" is a number given to each on-board ECU 3 when the on-board ECU 3 is manufactured, and is composed of a lot number indicating the production base or the like, a sequential number at the time of manufacturing, and the like. The manufacturing number is a number that can uniquely specify the ECU. The ECU part number (the model number) is a number that specifies the type of the on-board ECU, and is a component number, for example. The software part number is a number for specifying the type of software of the update program.

The "number of operating regions" is the number of storage areas that store different versions of the update program. That is to say, when the number of operating regions is two, two different versions of the update program can be recorded. When the number of operating regions is one, only one version of the update program can be stored. The operating region is information specifying the storage region (either the first storage area or the second storage area) in which the program that is currently being executed (adopted) by the on-board ECU 3 is stored.

The "current version" is the version number of the program that is currently being executed (adopted) by the on-board ECU 3, and is the version number of the program stored in the operating region. The "old version" is the version number of the program that was executed (adopted) previously by the on-board ECU 3, and is the version number of the program stored in the non-operating region (the storage area that is not the operating region).

The "MAC address" is an address corresponding to the data link layer when the vehicle interior communication units 23 of the on-board ECU 3 is a communication port that complies with Ethernet. The "MAC address" is a number given when the vehicle interior communication units 23 is manufactured, and is composed of a vender code that indicates the manufacturer, a sequential number at the time of manufacturing, and the like. The MAC address is a number that can uniquely specify the ECU. The "IP address" is an address corresponding to the network layer used to perform communication using the TCP/IP when the vehicle interior communication units 23 is a communication port that complies with Ethernet.

"VIN (Vehicle Identification Number)" is a unique code that includes a serial number used for identifying an individual vehicle C, is stipulated by ISO3833, and is made up of a 17-digit alphanumeric character. The VIN is not stored in the storage unit 31 of every on-board ECU 3 provided in the vehicle, but in the storage unit 31 of a specific on-board ECU 3.

The configuration information of each on-board ECU 3 includes identification information for identifying the on-board ECU 3. The IP address is an address that can be freely determined according to the settings of the vehicle interior communication unit 23, and therefore it is preferable to use the serial number or the MAC address as the identification information for identifying the on-board ECU 3. Alternatively, the identification information may include, in addition to the serial number and the MAC address, the ECU part number (the part number, the model number) of the on-board ECU 3.

The identification information of each on-board ECU 3 may be the serial number or MAC address included in the configuration information of the on-board ECU 3. The control unit 20 of the on-board communication device 2 stores, in the storage unit 21, the identification information of each on-board ECU 3 made up of the serial number or MAC address included in the configuration information, and information regarding progress of transmission of an update program to each on-board ECU 3 such as previous update completion date and time and the reprograming status in association with each other.

Information included in the configuration information of each on-board ECU 3 is not limited to the information of the items shown in FIG. 3. When the on-board ECU 3 is connected via a CAN, the configuration information of the on-board ECU 3 may include a CAN-ID that is to be used (included) when the on-board ECU 3 transmits a message.

Figure 4:
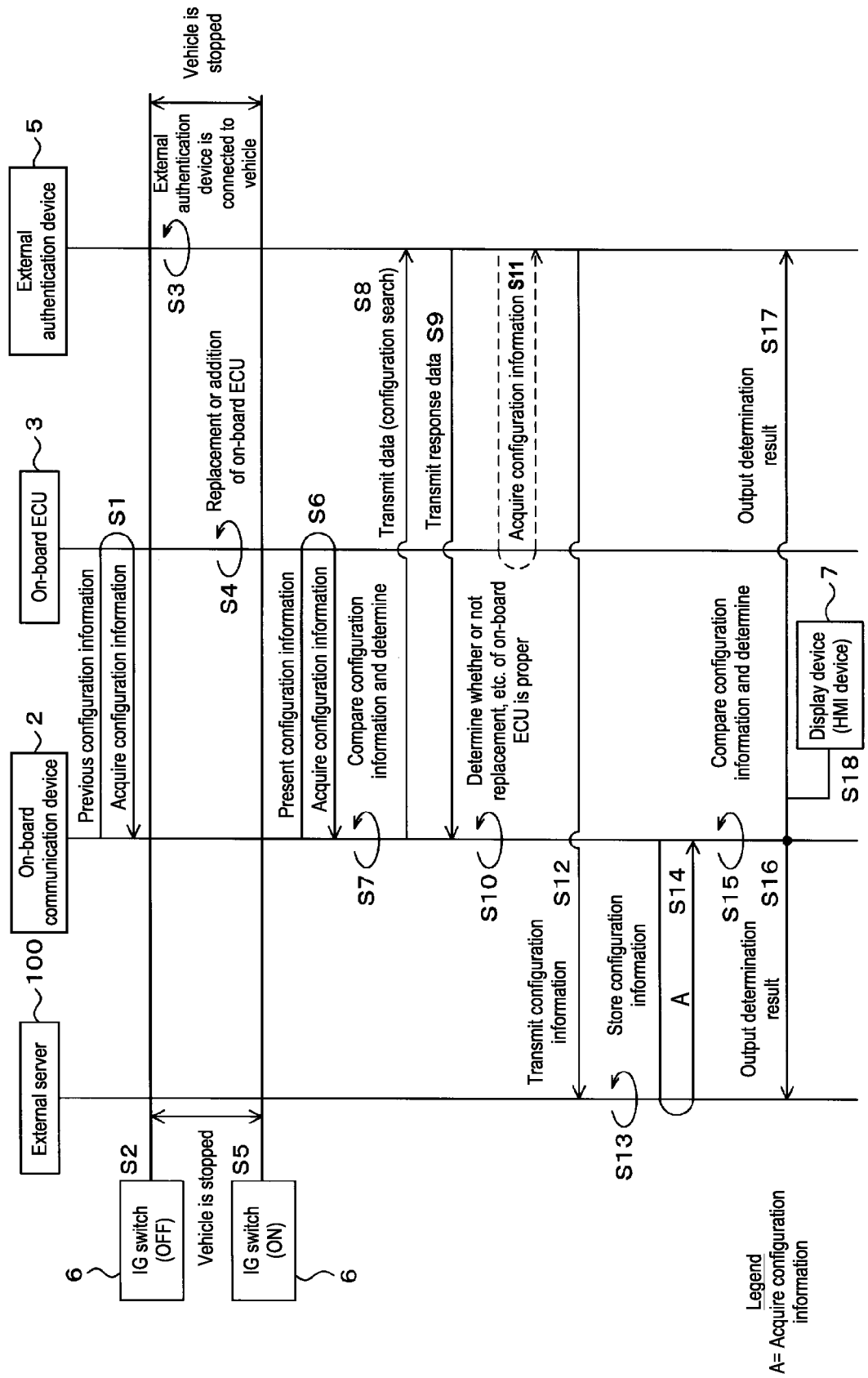
FIG. 4 is an illustration diagram illustrating an aspect of determinations made by the on-board communication device.

FIG. 4 is an illustration diagram illustrating an aspect of determinations that are made by the on-board communication device 2. In FIG. 4, processing that is performed when replacement or the like of an on-board ECU 3 is performed, the processing being performed by the on-board communication device 2 regarding a determination of whether or not such replacement is proper, will be described with reference to a sequence diagram that includes processing performed by the external server 100, the external authentication device 5, and the like.

The on-board communication device 2 acquires configuration information from each on-board ECU 3, and stores the information in the storage unit 21 thereof (step S1). The on-board communication device 2 stores the acquired configuration information in the storage unit 21 as previously-acquired configuration information (previous configuration information). A configuration may also be adopted in which the on-board communication device 2 acquires configuration information when the IG switch 6 is turned on as will be described later, and thus stores configuration information acquired when the IG switch 6 was turned on previously, in the storage unit 21 as previous configuration information. Alternatively, a configuration may also be adopted in which the on-board communication device 2 stores, in the storage unit 21, information regarding the time point when configuration information is acquired (date and time) and the acquired configuration information in association with each other, and performs history management of each piece of acquired configuration information.

The vehicle C enters a stopped state due to the IG switch 6 being turned off (step S2), and on-board devices such as the on-board communication device 2 and on-board ECUs 3 enter a stopped state or a standby state. Usually, replacement or addition of an on-board ECU 3 is performed while the vehicle C is in a stopped state.

As preparation work for replacement or the like of an on-board ECU 3, the external authentication device 5 is connected to the vehicle C (S3). The external authentication device 5 and the vehicle C are connected as a result of the external authentication device 5 being connected to the vehicle interior communication units 23 of the on-board communication device 2 as shown in FIG. 2, for example.

Replacement or addition of an on-board ECU 3 is performed (S4). When replacement work or the like of an on-board ECU 3 is performed, the external authentication device 5 forcibly starts an on-board ECU 3 that is a replacement by supplying power to the replacement on-board ECU 3, for example, performs communication with the on-board ECU 3 in a diagnosis mode or the like, and performs a unit test of the on-board ECU 3. Configuration information of the on-board ECUs 3 provided in the vehicle C changes as a result of replacement or addition of an on-board ECU 3 being performed.

The vehicle C enters an activated state due to the IG switch 6 being turned on (step S5), and the on-board communication device 2 and all of the on-board ECUs 3 including the replacement on-board ECU 3 enter the activated state.

The on-board communication device 2 acquires configuration information from each on-board ECU 3 (step S6). Similarly to the processing in step S1, the on-board communication device 2 acquires configuration information after the IG switch 6 has been turned on, and stores the acquired information as presently-acquired configuration information (present configuration information) in the storage unit 21.

The on-board communication device 2 compares acquired pieces of configuration information of each on-board ECU 3, and determines whether or not the on-board ECU 3 has undergone replacement (step S7). The on-board communication device 2 compares presently-acquired configuration information with previously-acquired configuration information, and determines whether or not the on-board ECU 3 has undergone replacement, based on these pieces of configuration information being the same or different.

The on-board communication device 2 outputs (transmits) data that includes the presently-acquired configuration information to the external authentication device 5 (step S8). Alternatively, the on-board communication device 2 may transmit, to the external authentication device 5, request data requesting a response. That is to say, the on-board communication device 2 attempts communication with the external authentication device 5.

The external authentication device 5 transmits predetermined response data to the on-board communication device 2 in response to transmission of the data from the on-board communication device 2 (step S9). The on-board communication device 2 determines whether or not the replacement of the on-board ECU 3 is proper based on the response data transmitted from the external authentication device 5 (step S10). The previously-acquired configuration information being different from the presently-acquired configuration information indicates that the on-board ECU 3 underwent replacement or the like while the vehicle C was stopped. In contrast, if, for example, the on-board communication device 2 cannot receive response data transmitted from the external authentication device 5, or data transmitted from the external authentication device 5 is different from the predetermined response data, it indicates that the external authentication device 5 that is currently connected to the vehicle C is not an authorized external authentication device 5. Therefore, if, for example, response data cannot be received, the on-board communication device 2 determines that the replacement of the on-board ECU 3 was improperly performed, by assuming that an unauthorized external authentication device 5 is connected or no external authentication device 5 is connected. Replacement or the like of an on-board ECU 3 being improper means that, for example, such replacement or the like was performed by an unauthorized person other than a vendor that has the external authentication device 5 such as a regular dealer. In addition, replacement or the like of an on-board ECU 3 being improper may mean that the on-board ECU resulting from replacement or the like is not a regular on-board ECU 3, but an unauthorized on-board ECU 3. If response data is received in a normal manner, the on-board communication device 2 determines that replacement of on-board ECU 3 was properly performed. The on-board communication device 2 may output (transmit) the determination result to the external server 100, the display device 7, or the external authentication device 5.

Furthermore, the on-board communication device 2, the external authentication device 5, and the external server 100 may execute the following processing. A configuration may also be adopted in which, when data that includes presently-acquired configuration information is not transmitted from the on-board communication device 2, the external authentication device 5 communicates with each on-board ECU 3, and acquires configuration information from the on-board ECU 3 (step S11).

The external authentication device 5 outputs (transmits) the configuration information acquired from the on-board communication device 2 or each on-board ECU 3, to the external server 100 (step S12). When the external authentication device 5 transmits the configuration information to the external server 100, authentication information is required. Therefore, if the external authentication device 5 is an authorized device, the external authentication device 5 has authentication information, and can transmit the authentication information to the external server 100 in a normal manner. However, if the external authentication device 5 connected to the vehicle C is an unauthorized device spoofing as an authorized device, the unauthorized device does not have authentication information, and thus cannot transmit it to the external server 100 in a normal manner, and thus the external server 100 cannot acquire configuration information.

The external server 100 stores the configuration information acquired (received) from the external authentication device 5, in the storage unit 101 thereof (step S13). If the external authentication device 5 is an authorized device, communication that uses authentication information is performed between the external server 100 and the external authentication device 5, and thus the external server 100 stores the configuration information acquired from the external authentication device 5, in the storage unit 101 thereof. The configuration information includes VIN (vehicle identification number), and thus the external server 100 can specify the vehicle C that has the configuration information, based on VIN.

The on-board communication device 2 communicates with the external server 100 via the vehicle exterior communication device 1, and acquires configuration information of the vehicle from the external server 100 (step S14). As described above, configuration information of each vehicle C held by the external server 100 (stored in the storage unit 101) includes the VIN (vehicle identification number) for specifying the vehicle C, and thus the on-board communication device 2 acquires configuration information of the vehicle C of its own from the external server 100 based on the VIN of the vehicle C.

The on-board communication device 2 compares presently-acquired configuration information (configuration information acquired in step S6) with configuration information acquired from the external server 100, and determines whether or not the external authentication device 5 is an authorized device (step S15). As described above, if the external authentication device 5 connected to the vehicle C is an unauthorized device spoofing as an authorized device, the external server 100 does not receive configuration information from the external authentication device 5 connected to the vehicle C (unauthorized device). Therefore, if the presently-acquired configuration information (configuration information acquired in step S6) and the configuration information acquired from the external server 100 are different, the on-board communication device 2 determines that the external authentication device 5 connected to the vehicle C is an unauthorized device spoofing as an authorized device, and replacement or the like of the on-board ECU 3 has been improperly performed. If the presently-acquired configuration information (configuration information acquired in step S6) and the configuration information acquired from the external server 100 are the same, the on-board communication device 2 determines that the external authentication device 5 connected to the vehicle C is an authorized device, and replacement or the like of the on-board ECU 3 has been properly performed.

The on-board communication device 2 outputs (transmits) information regarding whether or not an on-board ECU has undergone replacement or the like, whether or not such replacement is proper, and whether or not the external authentication device 5 connected to the vehicle C is proper, which are determination results, to the external server 100, the external authentication device 5 or the display device 7 (steps S16 to S18).

Figure 5:
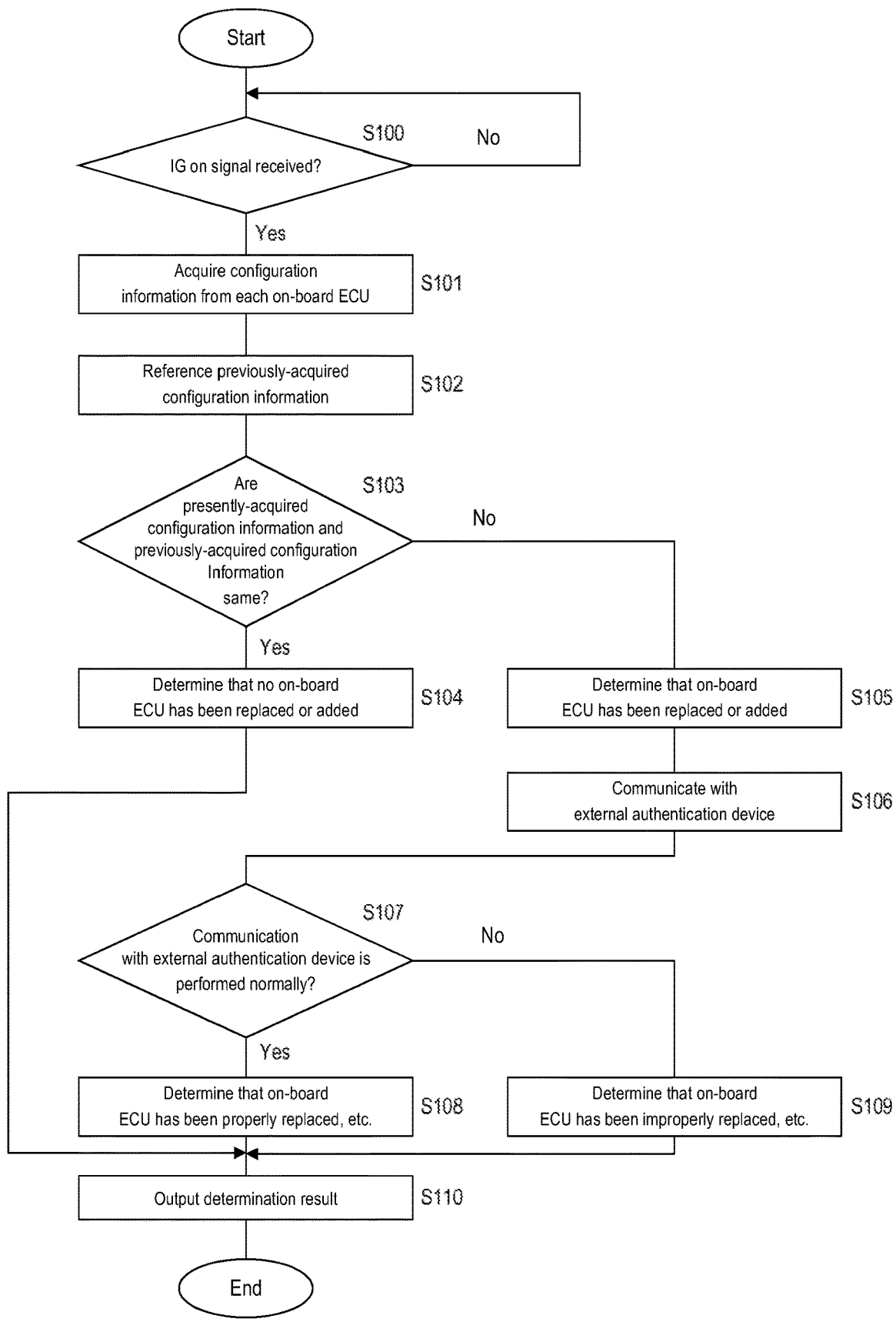
FIG. 5 is a flowchart illustrating processing that is performed by a control unit of the on-board communication device.

FIG. 5 is a flowchart illustrating processing that is performed by the control unit 20 of the on-board communication device 2. The flowchart to be described as the first embodiment corresponds to processing in steps S1 to S10 in the sequence diagram in FIG. 4. When the vehicle C is in a stopped state (the IG switch 6 is off), the control unit 20 of the on-board communication device 2 invariably performs the following processing.

The control unit 20 of the on-board communication device 2 determines whether or not an IG on signal has been received (step S100). The control unit 20 determines whether or not a signal indicating that the IG switch 6 was turned on (IG on signal) has been received, based on a signal transmitted from the IG switch 6 via the input/output I/F 22. If no IG on signal has been received (step S100: NO), the control unit 20 of the on-board communication device 2 performs loop processing to execute the processing in step S100 again. That is to say, the control unit 20 performs standby processing until the IG on signal is received.

If the IG on signal is received (step S100: YES), the control unit 20 of the on-board communication device 2 acquires configuration information from each on-board ECU 3 (step S101). The control unit 20 stores the acquired configuration information as presently-acquired configuration information in the storage unit 21. Note that the storage unit 21 of the on-board communication device 2 stores configuration information acquired in previous processing, or in other words, when the IG on signal was received previously, and the configuration information is managed as previously-acquired configuration information. A configuration may also be adopted in which, in an activated state before the vehicle C enters a stopped state, the control unit 20 acquires configuration information from each on-board ECU 3, and stores the acquired configuration information as the previously-acquired configuration information in the storage unit 21. Alternatively, a configuration may also be adopted in which, every time configuration information is acquired, the on-board communication device 2 associates the time point (date and time) when configuration information is acquired with the configuration information, manages the history of acquired pieces of configuration information, and thereby specifies previously-acquired configuration information corresponding to presently-acquired configuration information.

The control unit 20 of the on-board communication device 2 references the previously-acquired configuration information (step S102). As described above, the previously-acquired configuration information is stored in the storage unit 21 of the on-board communication device 2, and the control unit 20 references the storage unit 21, and reads out the previously-acquired configuration information. That is to say, the control unit 20 reads out the previously-acquired configuration information acquired before the present processing was executed and stored in the storage unit 21, by referencing the storage unit 21.

The control unit 20 of the on-board communication device 2 determines whether or not the presently-acquired configuration information is the same as the previously-acquired configuration information (step S103). The control unit 20 compares the presently-acquired configuration information with the previously-acquired configuration information, and determines whether or not any on-board ECU 3 has undergone replacement, addition, or removal (detachment), based on the ECU manufacturing numbers, the ECU part numbers, the Software part numbers, or the current versions of the program of each on-board ECU 3 included in the presently-acquired configuration information and the previously-acquired configuration information being the same or different.

If the presently-acquired configuration information and the previously-acquired configuration information are the same (step S103: YES), the control unit 20 of the on-board communication device 2 determines that no on-board ECU 3 has been replaced, added, or removed (step S104).

If the presently-acquired configuration information and the previously-acquired configuration information are not the same (step S103: NO), in other words the presently-acquired configuration information and the previously-acquired configuration information are different, it is determined that an on-board ECU 3 has undergone replacement, addition, or removal (step S105). As described above, configuration information includes not only hardware-related information such as the manufacturing number of the on-board ECU 3, but also software-related information such as the Software part number and the version of the program. Therefore, regarding replacement of an on-board ECU 3, the previous configuration information and the present configuration information are different not only in a case where an on-board ECU 3 itself, or in other words, hardware is replaced, but also in a case where a program installed in the on-board ECU 3 is replaced (software is rewritten). Therefore, replacement of an on-board ECU 3 includes replacement of hardware and replacement of software. When an on-board ECU 3 is added or removed, the number of ECU-IDs is increased/decreased as shown in FIG. 3, and thus it is possible to make a determination of addition or removal of any on-board ECU 3 based on the number of on-board ECUs 3 indicated by the number of rows of the ECU-IDs. A configuration may also be adopted in which the control unit 20 of the on-board communication device 2 specifies an on-board ECU 3 that has undergone replacement, addition, or removal based on the determination result, and stores the specified on-board ECU 3 in the storage unit 21.

The control unit 20 of the on-board communication device 2 communicates with the external authentication device 5 (step S106). The control unit 20 attempts communication with (access to) the external authentication device 5 via the vehicle interior communication units 23 to communicate with the external authentication device 5. Communication between the control unit 20 and the external authentication device 5 is performed as a result of, for example, the control unit 20 transmitting request data requesting a response, to the external authentication device 5 via the vehicle interior communication units 23, and receiving response data transmitted by the external authentication device 5 based on the request data. Alternatively, a configuration may also be adopted in which the control unit 20 transmits the presently-acquired configuration information to the external authentication device 5, and receives response data from the external authentication device 5 in response to the transmission. Alternatively, a configuration may also be adopted in which the control unit 20 performs processing for waiting for data transmitted from the external authentication device 5, for a predetermined period, without transmitting any request data or the like. In this manner, communication between the on-board communication device 2 (the control unit 20) and the external authentication device 5 is performed through pull communication in which the external authentication device 5 makes a response based on a request from the on-board communication device 2 or push communication performed from the external authentication device 5 to the on-board communication device 2.

The control unit 20 of the on-board communication device 2 determines whether or not communication with the external authentication device 5 is performed in a normal manner (step S107). As described above, the control unit 20 determines whether or not communication with the external authentication device 5 is successful (performed in a normal manner), based on whether or not response data or the like from the external authentication device 5 has been received. If communication with the external authentication device 5 is performed in a normal manner (step S107: YES), the control unit 20 of the on-board communication device 2 determines that replacement or the like of the on-board ECU 3 has been properly performed (step S108). If communication with the external authentication device 5 is not performed in a normal manner (step S107: NO), the control unit 20 of the on-board communication device 2 determines that replacement or the like of the on-board ECU 3 has been improperly performed (step S109).

After executing the processing of step S104, S108 or S109, the control unit 20 of the on-board communication device 2 outputs the determination result (step S110). The control unit 20 outputs (transmits) one or both of the determination result on whether or not replacement or the like of the on-board ECU 3 is proper (processing result in step S108 or S109) and the determination result on whether or not an on-board ECU 3 has undergone replacement or the like (processing result in step S104 or S105), to the display device 7 (HMI device), the external server 100, or the external authentication device 5, for example. If it is determined that replacement or the like of an on-board ECU 3 has been improperly performed, the control unit 20 of the on-board communication device 2 specifies the on-board ECU 3 that has undergone replacement or the like, and stores, in the storage unit 21, the specified on-board ECU 3 in association with the determination results. A configuration may also be adopted in which, if it is determined that replacement or the like of the on-board ECU 3 has been improperly performed, the control unit 20 outputs (transmits) information regarding the on-board ECU 3 that has undergone improper replacement, along with the determination results, to the display device 7, the external server 100, or the external authentication device 5. As a result of these determination results being output (transmitted) to the display device 7 (HMI device), the external server 100, or the external authentication device 5, and being displayed, it is possible to perform notification of the determination results to the operator of the vehicle C, the administrator of the external server 100, or a worker that performs replacement or the like of an on-board ECU 3, so as to alert them to take appropriate measures. The control unit 20 of the on-board communication device 2 may store the determination results in the storage unit 21. A configuration may also be adopted in which, when storing the determination results in the storage unit 21, the control unit 20 stores the determination results in association with the presently-acquired configuration information acquired in the processing in step S101.

After performing the processing in step S110, the control unit 20 of the on-board communication device 2 ends the processing in this flowchart. Alternatively, a configuration may also be adopted in which, after performing the processing in step S110, the control unit 20 performs loop processing to execute the processing in step S100 again.

When communication with the external authentication device 5 is not performed in a normal manner, or in other words, when response data or the like from the external authentication device 5 cannot be received, it indicates that the external authentication device 5 (the authorized external authentication device 5) is not connected. Therefore, it indicates that work of replacement or the like of the on-board ECU 3 was performed without establishing connection of the external authentication device 5, which is required for performing the work. In contrast, if it is determined that an on-board ECU 3 has undergone replacement or the like, or in other words, if replacement or the like of an on-board ECU 3 is detected, the control unit 20 of the on-board communication device 2 can determine whether or not such replacement or the like of the on-board ECU 3 is proper, based on whether or not communication with the external authentication device 5, which is necessary for performing work of replacement or the like, is successful. That is to say, it is possible to determine that replacement or the like of an on-board ECU 3 performed without connection of the external authentication device 5 is improper.

Communication between the on-board communication device 2 (the control unit 20) and the external authentication device 5 is performed through wired communication or narrow-band wireless communication by the vehicle interior communication units 23. Therefore, for example, even in a radio wave condition in which it is difficult to perform broad-band wireless communication of 4G or the like, it is possible to reliably perform communication between the on-board communication device 2 (the control unit 20) and the external authentication device 5 without being affected by the radio wave condition.

Second Embodiment

Figure 6:
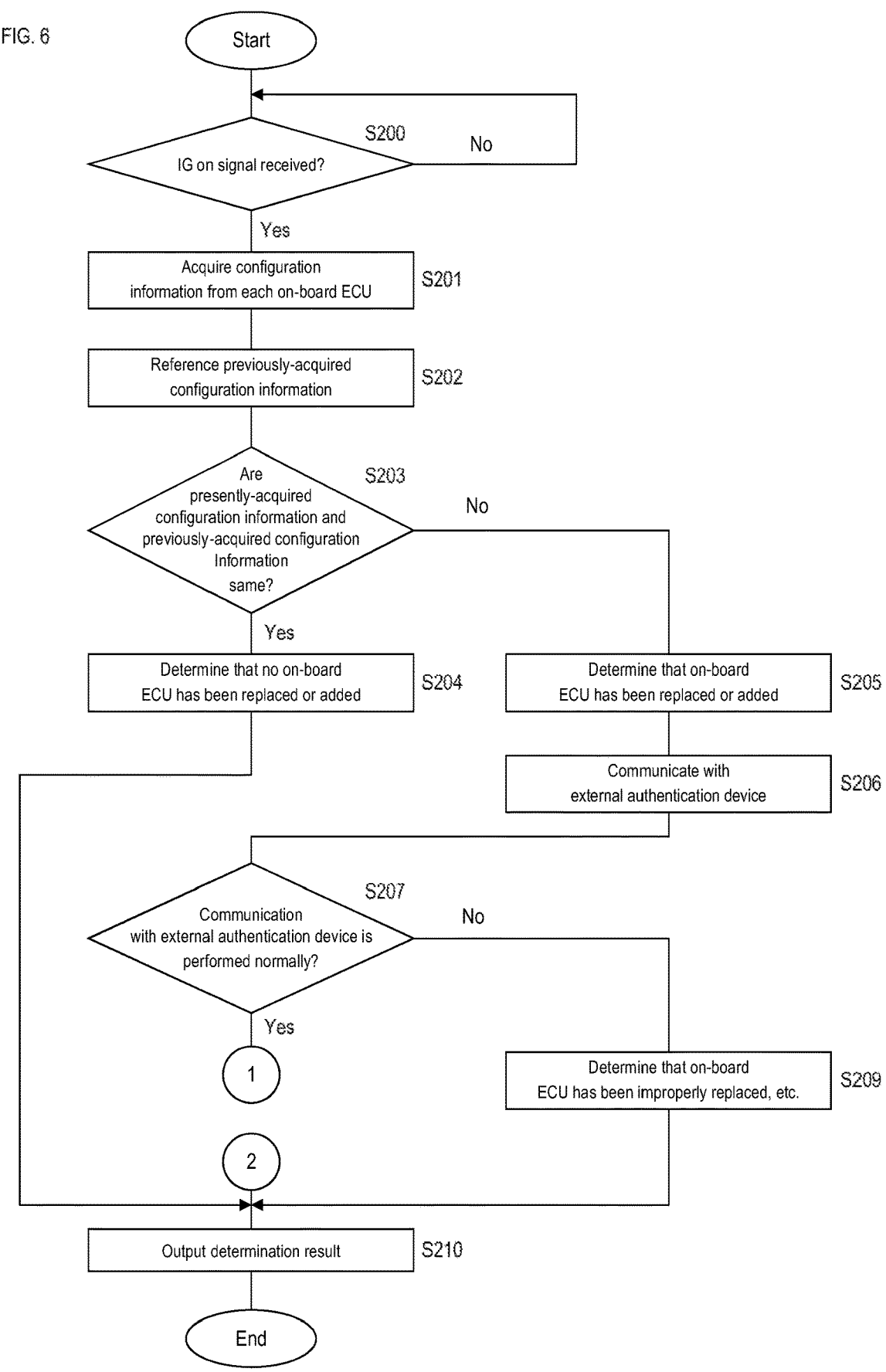
FIG. 6 is a flowchart illustrating processing that is performed by a control unit of an on-board communication device according to a second embodiment.
Figure 7:
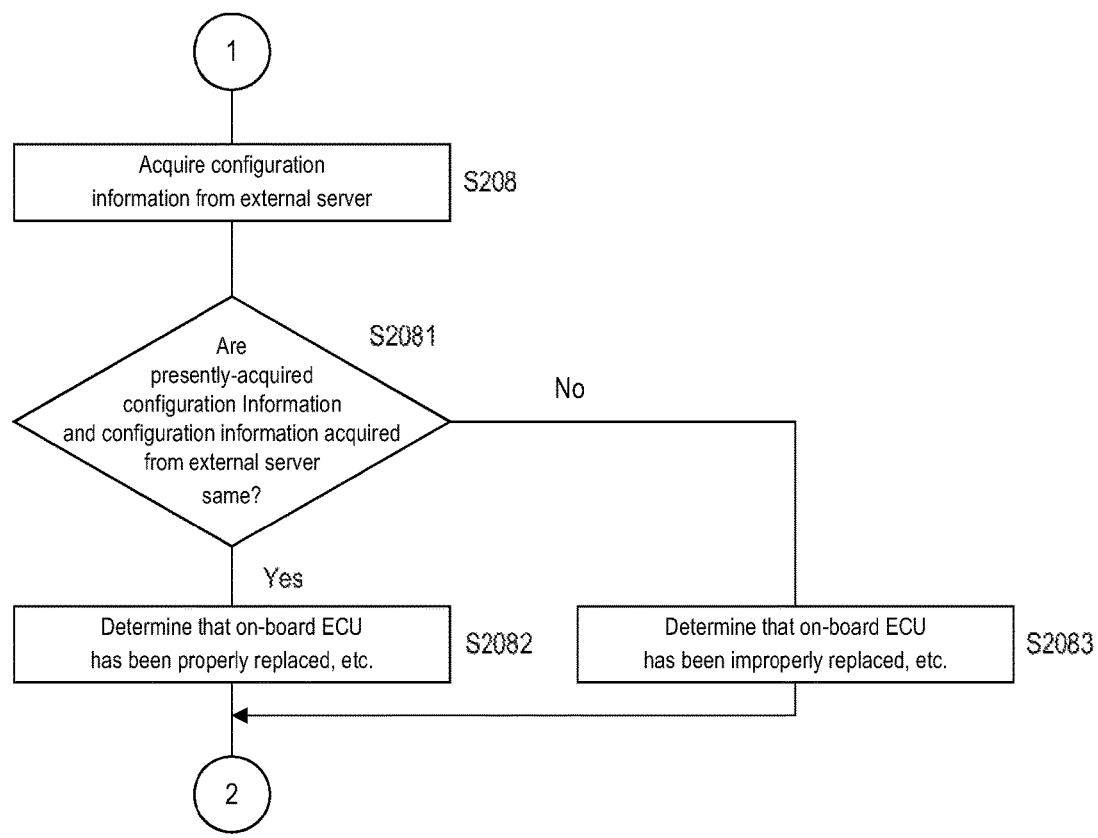
FIG. 7 is a flowchart illustrating processing that is performed by the control unit of the on-board communication device according to the second embodiment.

FIG. 6 is a flowchart illustrating processing that is performed by the control unit 20 of the on-board communication device 2 according to a second embodiment. FIG. 7 is a flowchart illustrating processing that is performed by the control unit 20 of the on-board communication device 2 according to the second embodiment. The flowcharts that are described as flowcharts of the second embodiment correspond to the processing in steps S1 to S18 in the sequence diagram in FIG. 4, and particularly are related to the processing in step S11 onward. The second embodiment is different from the first embodiment in that, even if communication with the external authentication device 5 is performed in a normal manner, the control unit 20 of the on-board communication device 2 communicates with the external server 100 and determines whether or not replacement or the like of an on-board ECU 3 is proper. Similarly to the first embodiment, when the vehicle C is in a stopped state (the IG switch 6 is off), the control unit 20 of the on-board communication device 2 invariably performs the following processing.

The control unit 20 of the on-board communication device 2 performs processing in steps S200 to S204 similarly to the processing in steps S100 to S104 of the first embodiment, compares presently-acquired configuration information with previously-acquired configuration information, and determines whether or not an on-board ECU 3 has undergone replacement or the like (step S203).

The control unit 20 of the on-board communication device 2 performs processing in steps S205 to S207 similarly to the processing in steps S105 to S107 of the first embodiment, and, when an on-board ECU 3 undergoes replacement or the like, the control unit 20 determines whether or not communication with the external authentication device 5 is performed in a normal manner (step S207). If communication with the external authentication device 5 is not performed in a normal manner (step S207: NO), the control unit 20 of the on-board communication device 2 determines that the replacement or the like of an on-board ECU 3 has been performed improperly (step S209) similarly to the first embodiment.

If communication with the external authentication device 5 is performed in a normal manner (step S207: YES), the control unit 20 of the on-board communication device 2 acquires configuration information from the external server 100 (step S208). The external authentication device 5 transmits the acquired configuration information to the external server 100. Therefore, it is envisioned that the configuration information transmitted from the external authentication device 5 is held in the external server 100 (stored in the storage unit 101 of the external server 100). The control unit 20 of the on-board communication device 2 communicates with the external server 100 via the vehicle exterior communication device 1, and acquires the configuration information from the external server 100.

The control unit 20 of the on-board communication device 2 determines whether or not the presently-acquired configuration information is the same as the configuration information acquired from the external server 100 (step S2081). The control unit 20 compares the presently-acquired configuration information acquired in the processing in step S201 with the configuration information acquired from the external server 100, and determines whether or not these pieces of configuration information are the same.

If the presently-acquired configuration information and the configuration information acquired from the external server 100 are the same (step S2081: YES), the control unit 20 of the on-board communication device 2 determines that replacement or the like of an on-board ECU 3 has been properly performed (step S2082).

If the presently-acquired configuration information and the configuration information acquired from the external server 100 are not the same (step S2081: NO), the control unit 20 of the on-board communication device 2 determines that replacement or the like of the on-board ECU 3 has been improperly performed (step S2083). That is to say, the external authentication device 5 is not an authorized device but an unauthorized device spoofing as the external authentication device 5, and the control unit 20 determines that replacement or the like of the on-board ECU 3 has been improperly performed. When an on-board ECU 3 undergoes replacement or the like, the external authentication device 5 acquires configuration information of each on-board ECU 3 mounted in the vehicle C after the replacement or the like, and transmits the acquired configuration information along with authentication information that includes a public key or a common key, for example, to the external server 100 based on a predetermined regular communication procedure. The external authentication device 5 that acquires configuration information of the on-board ECUs 3 may be an external authentication device 5 that directly communicates with the on-board ECUs 3 to acquire configuration information from these on-board ECUs 3 or an external authentication device 5 that communicates with the on-board communication device 2 to acquire configuration information that has been acquired by the on-board communication device 2 and stored in the storage unit 21, from the on-board communication device 2.

The external server 100 receives information transmitted from the external authentication device 5, and determines whether or not the information transmitted from the external authentication device 5 is valid, based on the authentication information, and, if the information is based on the above-described regular communication procedure, the external server 100 acquires the information transmitted from the external authentication device 5, and stores the information in the storage unit 101 thereof, for example. However, if the external authentication device 5 is not an authorized device, but an unauthorized device spoofing as the external authentication device 5, the unauthorized device can make it appear as if communication with the on-board communication device 2 (the control unit 20), which is processing in step S206, is performed in a normal manner, but cannot communicate with the external server 100 using regular communication means that uses authentication information. Therefore, there arises a difference between the configuration information stored in the storage unit 21 of the external server 100 and configuration information acquired by the control unit 20 in the current processing (presently-acquired configuration information). In view of this, if it is determined that the presently-acquired configuration information and the configuration information acquired from the external server 100 are not the same, or in other words, are different, the control unit 20 determines that the external authentication device 5 is not an authorized device, and is an unauthorized device spoofing as the external authentication device 5, and that replacement or the like of an on-board ECU 3 has been improperly performed.

After executing the processing in step S204, S2082, S2083, or S209, the control unit 20 of the on-board communication device 2 outputs (transmits) the determination result similarly to the first embodiment (step S210). The control unit 20 outputs (transmits) one or both of the determination result on whether or not replacement or the like of an on-board ECU 3 is proper (processing result in step S2082, S2083, or S209) and the determination result on whether or not an on-board ECU 3 has undergone replacement or the like (processing result in step S204 or S205), to the display device 7 (HMI device), the external server 100, or the external authentication device 5, for example. As a result of these determination results being output (transmitted) to the display device 7 (HMI device), the external server 100, or the external authentication device 5, it is possible to perform notification of the determination results to the operator of vehicle C, the administrator of the external server 100, or a worker that performs replacement or the like of an on-board ECU 3 so as to alert them to take appropriate measures. The control unit 20 of the on-board communication device 2 may store the determination results in the storage unit 21. A configuration may also be adopted in which, when storing the determination results in the storage unit 21, the control unit 20 stores the determination results in association with the presently-acquired configuration information acquired in the processing in step S201.

After performing the processing in step S210, the control unit 20 of the on-board communication device 2 ends the processing in this flowchart. Alternatively, after performing the processing in step S210, the control unit 20 may perform loop processing to execute the processing in step S200 again.

It is envisioned that the external authentication device 5 is not an authorized device but an unauthorized device that spoofs as the external authentication device 5 and is connected to the vehicle C, and an on-board ECU undergoes replacement or the like. Furthermore, even when the unauthorized device makes it appear as if communication with the on-board communication device 2 (the control unit 20) is performed in a normal manner, the on-board communication device 2 (the control unit 20) can detect an unauthorized device spoofing as the external authentication device 5, based on the configuration information acquired from the external server 100. Also, the control unit 20 of the on-board communication device 2 can determine that replacement or the like of an on-board ECU 3 performed in a state where an unauthorized device spoofing as the external authentication device 5 is connected to the vehicle C was improperly performed.

Third Embodiment

Figure 8:
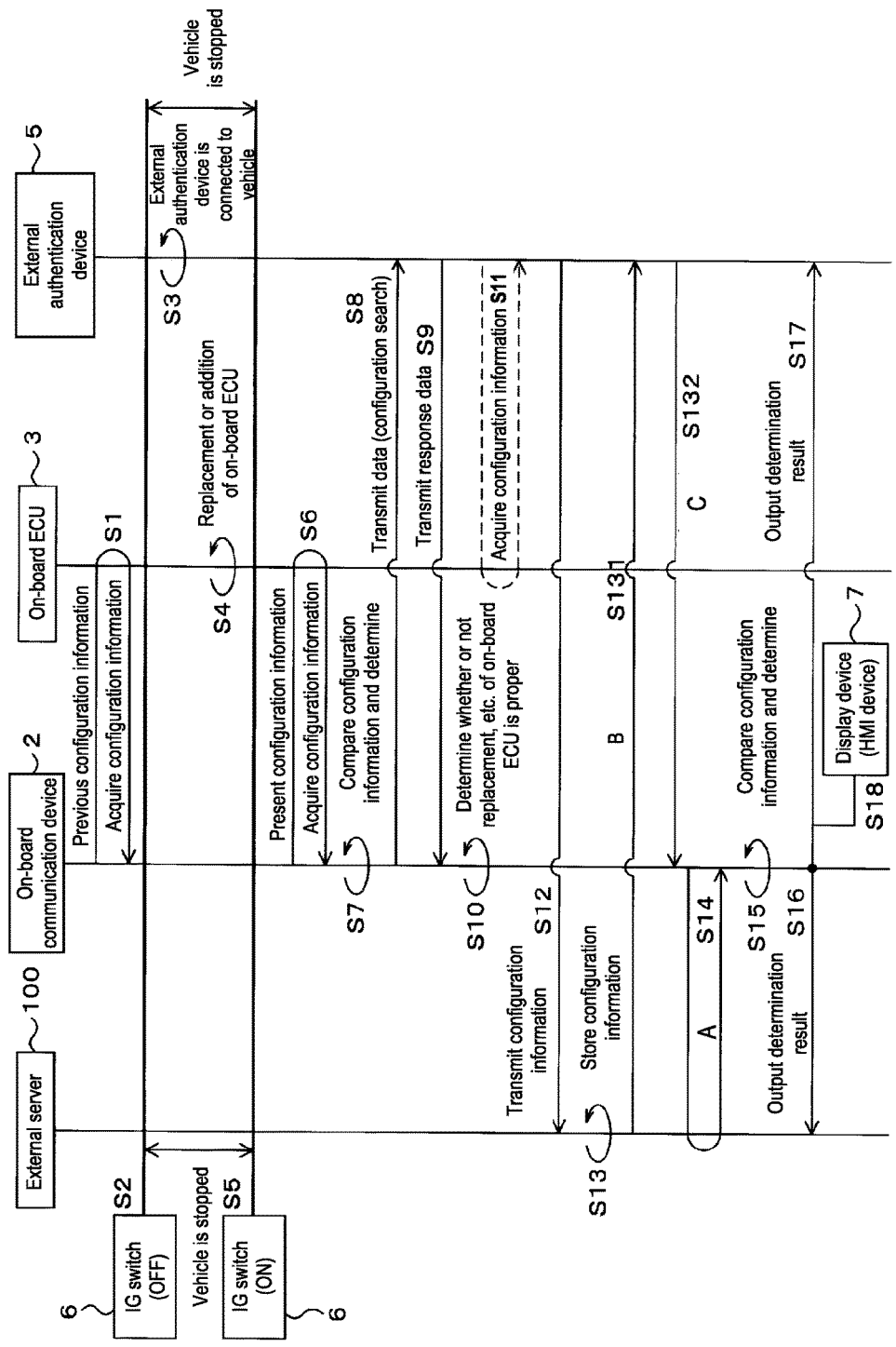
FIG. 8 is an illustration diagram illustrating an aspect of determinations made by an on-board communication device according to a third embodiment.

FIG. 8 is an illustration diagram illustrating an aspect of determinations that are made by an on-board communication device according to a third embodiment. In FIG. 8, processing that is performed by the on-board communication device 2 in relation to a determination of, when an on-board ECU 3 undergoes replacement or the like, whether or not such replacement is proper will be described with reference to the sequence diagram that includes processing that is performed by the external server 100, the external authentication device 5, and the like. The external server 100, the on-board communication device 2, each on-board ECU 3, and the external authentication device 5 perform the processing in steps S1 to S13, similarly to the first embodiment.

The external server 100 performs the processing in step S13 similarly to the first embodiment, and if such processing (for receiving and storing configuration information transmitted from the external authentication device 5) is completed in a normal manner, the external server 100 transmits (outputs) a message indicating that configuration information transmitted from the external authentication device 5 has been received (acquired) in a normal manner to the external authentication device 5 (step S131).

Upon receiving the message indicating that the configuration information transmitted from the external server 100 has been received in a normal manner, the external authentication device 5 transmits (outputs), to the on-board communication device 2, a notification that transmission of the configuration information to the external server 100 has been completed in a normal manner (transmission completion notification) (step S132).

Upon receiving (acquiring) the transmission completion notification from the external authentication device 5, the on-board communication device 2 communicates with the external server 100 via the vehicle exterior communication device 1 similarly to the first embodiment, and acquires the configuration information of the vehicle from the external server 100 (step S14). The external server 100, the on-board communication device 2, each on-board ECU 3, and the external authentication device 5 perform the processing in steps S15 to S18, similarly to the first embodiment.

Figure 9:
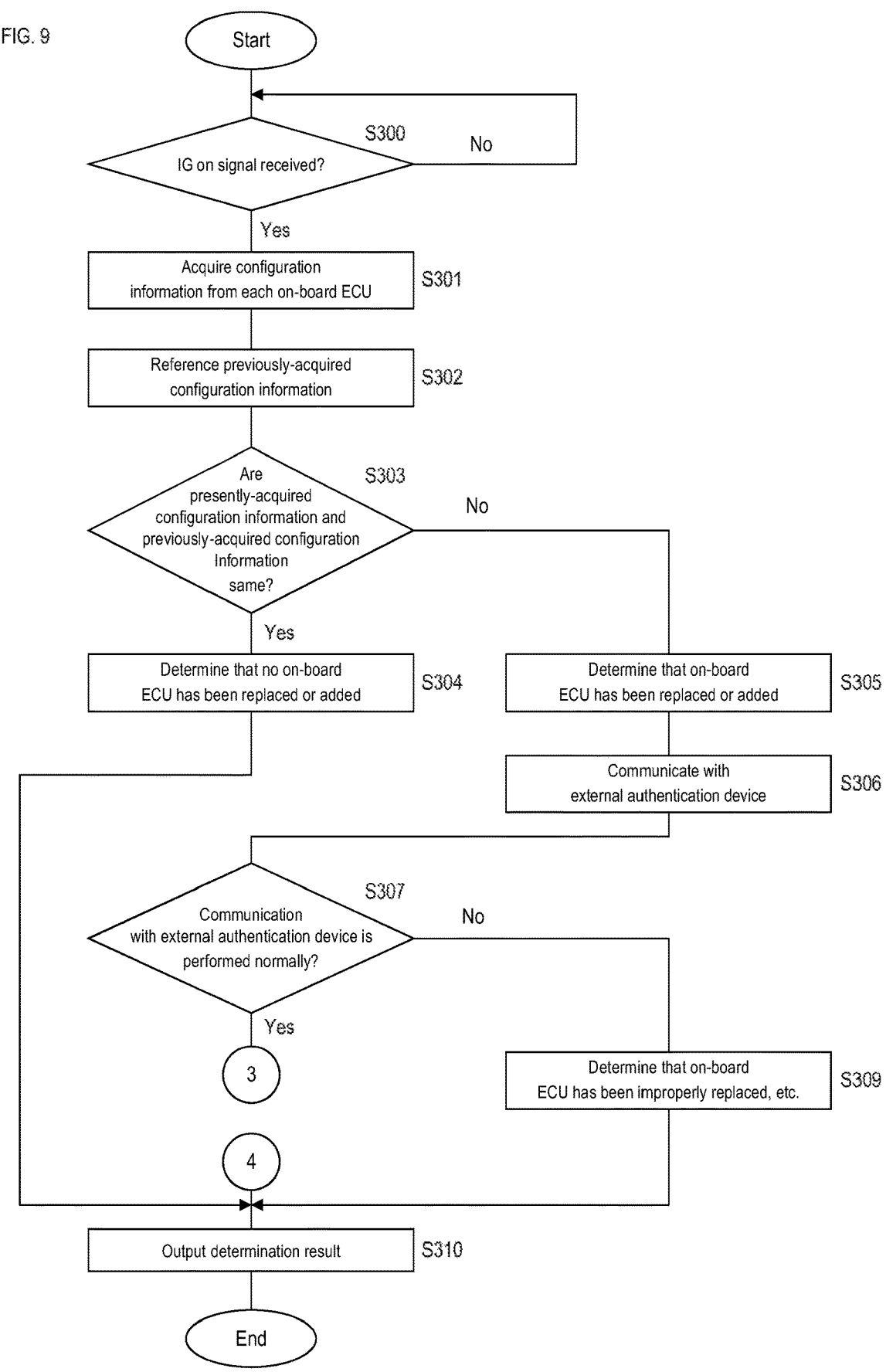
FIG. 9 is a flowchart illustrating processing that is performed by a control unit of the on-board communication device according to the third embodiment.
Figure 10:
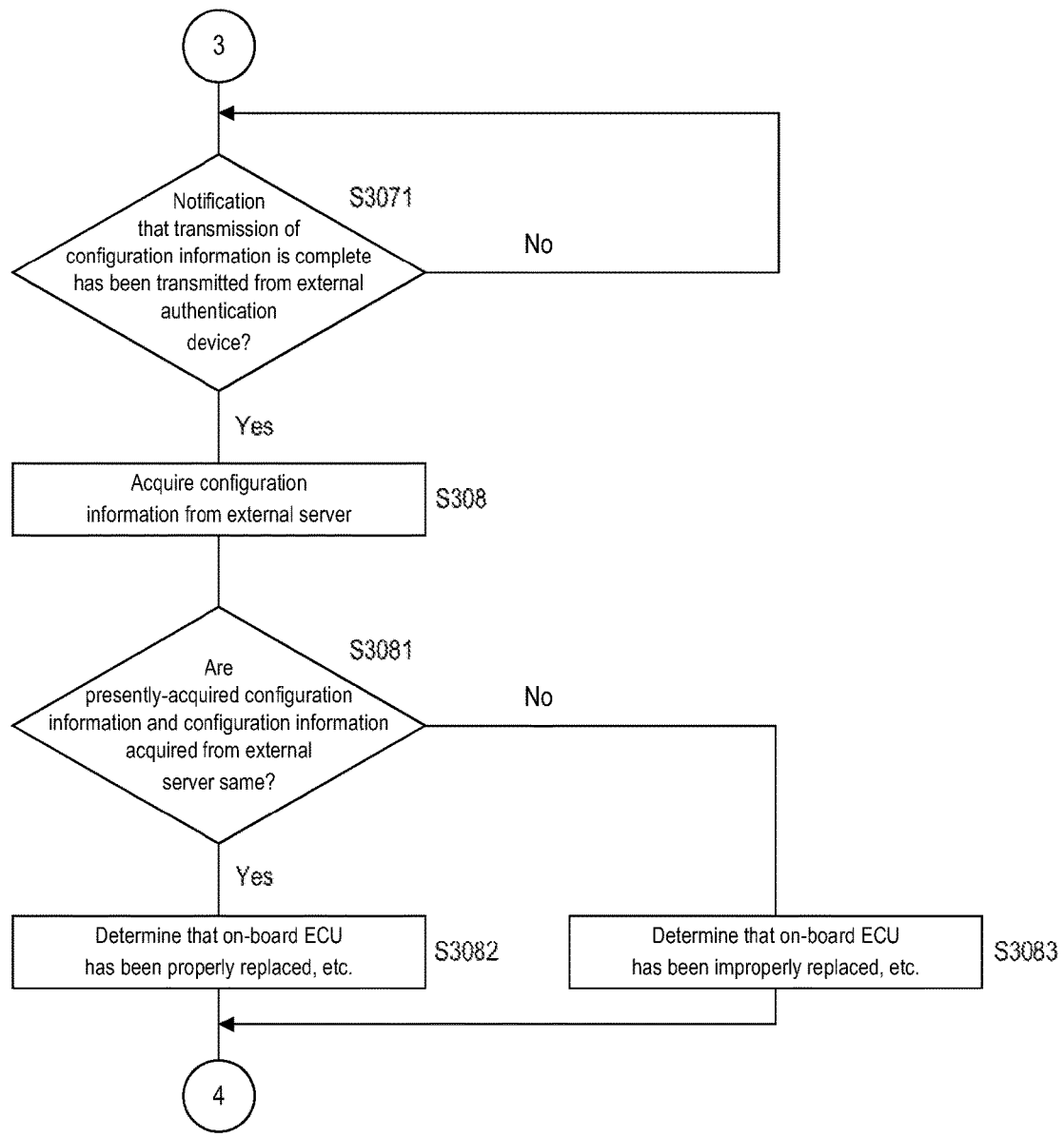
FIG. 10 is a flowchart illustrating processing that is performed by the control unit of the on-board communication device according to the third embodiment.

FIGS. 9 and 10 are flowcharts illustrating processing that is performed by the control unit of the on-board communication device according to the third embodiment. Similarly to the first or second embodiment, the control unit 20 of the on-board communication device 2 invariably performs the following processing when the vehicle C is in a stopped state (the IG switch 6 is off). The control unit 20 of the on-board communication device 2 performs processing in steps S300 to S304 similarly to the processing in steps S200 to S204 of the second embodiment, and compares presently-acquired configuration information with previously-acquired configuration information, and determines whether or not an on-board ECU 3 has undergone replacement or the like (S303).

The control unit 20 of the on-board communication device 2 performs processing in steps S305 to S307, similarly to the processing in steps S205 to S207 of the second embodiment, and if an on-board ECU 3 has undergone replacement or the like, the control unit 20 determines whether or not communication with the external authentication device 5 is performed in a normal manner (S307). If communication with the external authentication device 5 is not performed in a normal manner (S307: NO), the control unit 20 of the on-board communication device 2 determines that replacement or the like of the on-board ECU 3 has been improperly performed, similarly to the first embodiment (S309).

If communication with the external authentication device 5 is performed in a normal manner (S307: YES), the control unit 20 of the on-board communication device 2 determines whether or not a notification that transmission of configuration information is complete (transmission completion notification) has been transmitted from the external authentication device 5 (step S3071).

If the notification that transmission of configuration information is complete (transmission completion notification) has not been transmitted (step S3071: NO), or in other words, if the control unit 20 has not received (acquired) the transmission completion notification, the control unit 20 performs loop processing to execute the processing in step S3071 again. That is to say, the control unit 20 performs standby processing until the notification that transmission of configuration information is complete (transmission completion notification) is received from the external authentication device 5.

When the notification that transmission of configuration information is complete (transmission completion notification) has been transmitted (step S3071: YES), or in other words, when the control unit 20 receives (acquires) the transmission completion notification, the control unit 20 acquires configuration information from the external server 100 (step S308) similarly to the processing in step S208 of the first embodiment.

The control unit 20 of the on-board communication device 2 performs processing in steps S3081 to S3083 and S310 similarly to the processing in steps S2081 to S2083 and S210 of the second embodiment.

The external server 100 is a server that stores and manages configuration information by storing the configuration information in the storage unit 101, and has the functionality of a so-called database server (DB server). In a series of processing according to this embodiment, the external server 100 that functions as a DB server is accessed by different devices that include the on-board communication device 2 and the external authentication device 5. In contrast, when a notification that transmission of configuration information from the external authentication device 5 to the external server 100 is complete (transmission completion notification) is received (acquired) from the external authentication device 5, the on-board communication device 2 acquires the configuration information from the external server 100. Therefore, before the configuration information stored in the external server 100 is updated, or in other words, before transmission of configuration information from the external authentication device 5 is complete, the on-board communication device 2 can be prevented from acquiring old configuration information from the external server 100.

The present embodiments in the present disclosure are examples in all aspects, and should be construed as non-limiting. The scope of the present disclosure is not limited to the above meanings, but is indicated by the claims, and is intended to include all modifications within the meaning and scope equivalent to the scope of the claims.

The invention claimed is:

1. An on-board communication device configured to be communicably connected to on-board ECUs provided in a vehicle, and to acquire configuration information transmitted from the on-board ECUs, the on-board communication device comprising:
   a control unit,
   wherein the control unit controls communication with an external authentication device that is connected from outside of the vehicle when replacement or addition of an on-board ECU is performed,
   the control unit transmits a signal to the external authentication device when a previously acquired configuration is different from a presently acquired configuration information, and
   determines that the on-board ECU has undergone improper replacement or addition when a signal from external authentication device is not received.

2. The on-board communication device according to claim 1, wherein when the vehicle is started, the control unit acquires configuration information from the on-board ECUs.

3. The on-board communication device according to claim 1, wherein if it is determined that an on-board ECU has undergone improper replacement or addition, the control unit specifies the on-board ECU that has undergone improper replacement or addition, based on a difference between the previously-acquired configuration information and the presently-acquired configuration information.

4. The on-board communication device according to claim 1, wherein if it is determined that the on-board ECU has undergone improper replacement or addition, the control unit transmits information regarding the determination to a display device provided in the vehicle.

5. The on-board communication device according to claim 1, wherein the control unit outputs the presently-acquired configuration information to the external authentication device, and
   the configuration information output to the external authentication device is transmitted to an external server outside of the vehicle by the external authentication device.

6. The on-board communication device according to claim 5, wherein when communication with the external authentication device is performed in a normal manner, the control unit acquires the configuration information transmitted from the external authentication device to the external server, from the external server via a vehicle exterior communication device communicably connected to the control unit, and
   if the configuration information acquired from the external server is different from the presently-acquired configuration information, the control unit determines that the external authentication device is unauthorized.

7. The on-board communication device according to claim 6, wherein when a notification that transmission of configuration information from the external authentication device to the external server is complete is acquired from the external authentication device, the control unit acquires the configuration information transmitted from the external authentication device to the external server, from the external server via the vehicle exterior communication device communicably connected to the control unit.

8. A computer program product comprising a non-transitory, machine-readable medium storing instructions which, when executed by at least one programmable processor, caused at least one programmable processor to perform operations comprising:

acquiring configuration information transmitted from on-board ECUs provided in a vehicle;

transmitting a signal to an external authentication device that is connected from outside of the vehicle when replacement or addition of an on-board ECU is performed when a previously acquired configuration is different from a presently acquired configuration information; and determining that the on-board ECU has undergone improper replacement or addition when a signal from external authentication device is not received.

9. A communication method for executing processing for:

acquiring configuration information transmitted from on-board ECUs provided in a vehicle;

transmitting a signal to an external authentication device that is connected from outside of the vehicle when replacement or addition of an on-board ECU is performed when a previously acquired configuration is different from a presently acquired configuration information; and determining that the on-board ECU has undergone improper replacement or addition when a signal from external authentication device is not received.

10. The on-board communication device according to claim 2, wherein if it is determined that an on-board ECU has undergone improper replacement or addition, the control unit specifies the on-board ECU that has undergone improper replacement or addition, based on a difference between the previously-acquired configuration information and the presently-acquired configuration information.

11. The on-board communication device according to claim 2, wherein if it is determined that the on-board ECU has undergone improper replacement or addition, the control unit transmits information regarding the determination to a display device provided in the vehicle.

12. The on-board communication device according to claim 3, wherein if it is determined that the on-board ECU has undergone improper replacement or addition, the control unit transmits information regarding the determination to a display device provided in the vehicle.

13. The on-board communication device according to claim 2, wherein the control unit outputs the presently-acquired configuration information to the external authentication device, and the configuration information output to the external authentication device is transmitted to an external server outside of the vehicle by the external authentication device.

14. The on-board communication device according to claim 3, wherein the control unit outputs the presently-acquired configuration information to the external authentication device, and the configuration information output to the external authentication device is transmitted to an external server outside of the vehicle by the external authentication device.

15. The on-board communication device according to claim 4, wherein the control unit outputs the presently-acquired configuration information to the external authentication device, and the configuration information output to the external authentication device is transmitted to an external server outside of the vehicle by the external authentication device.

* * * * *